(12) United States Patent
Konstadinidis et al.

(10) Patent No.: US 7,817,892 B2
(45) Date of Patent: Oct. 19, 2010

(54) BEND INSENSITIVE FIBER OPTIC DROP CABLE FOR IN-HOME USE

(75) Inventors: Kariofilis Konstadinidis, Decatur, GA (US); David J. Mazzarese, Warren, MA (US); Richard Norris, Powder Springs, GA (US); Peter A. Weimann, Atalanta, GA (US)

(73) Assignee: OFS Fitel, LLC, Norcross, GA (US)

( * ) Notice: Subject to any disclaimer, the term of this patent is extended or adjusted under 35 U.S.C. 154(b) by 165 days.

(21) Appl. No.: 12/283,040

(22) Filed: Sep. 9, 2008

(65) Prior Publication Data

US 2009/0297105 A1    Dec. 3, 2009

Related U.S. Application Data

(60) Provisional application No. 61/056,468, filed on May 28, 2008.

(51) Int. Cl.
*G02B 6/036* (2006.01)
*G02B 6/00* (2006.01)

(52) U.S. Cl. .................................. 385/128; 385/126

(58) Field of Classification Search .......... 385/100–128
See application file for complete search history.

(56) References Cited

U.S. PATENT DOCUMENTS

| | | | |
|---|---|---|---|
| 5,684,910 A | 11/1997 | Chapin et al. | |
| 6,415,085 B1 | 7/2002 | Graham et al. | |
| 6,453,097 B1 | 9/2002 | Newton et al. | |
| 6,952,518 B2 * | 10/2005 | Zhang et al. | 385/126 |
| 7,373,057 B2 * | 5/2008 | Pizzorno et al. | 385/109 |
| 2003/0021533 A1 | 1/2003 | Ishikawa et al. | |
| 2003/0215198 A1 | 11/2003 | Newton et al. | |
| 2004/0179799 A1 * | 9/2004 | Konstadinidis et al. | 385/128 |
| 2006/0257071 A1 | 11/2006 | Bise et al. | |
| 2009/0060437 A1 | 3/2009 | Fini et al. | |

FOREIGN PATENT DOCUMENTS

| | | |
|---|---|---|
| EP | 1052528 A1 | 11/2000 |
| EP | 2003476 A1 | 12/2008 |
| EP | 2056148 A2 | 5/2009 |
| WO | WO2008/157341 A2 | 12/2008 |

OTHER PUBLICATIONS

European Patent Office, Extended Search Report for EP Application No. 09004465.2 (Dec. 2, 2009).
Corning Cable Systems LLC, Product Specifications for ClearCurve(tm) Compact Drop Cable (4 pages), Jan. 2008.
Corning Cable Systems LLC, Product Specifications for ClearCurve(tm) Rugged Drop Cable (2 pages), Jan. 2008.
Corning Inc., Corning ClearCurve(tm) Solutions, Advertisement (2 pages) (2007) at www.corning.com/clearcurve/solutions.htm.

* cited by examiner

*Primary Examiner*—Rhonda S Peace
(74) *Attorney, Agent, or Firm*—Law Office of Leo Zucker; Michael A. Morra

(57) ABSTRACT

A bend insensitive fiber optic cable includes a singlemode fiber, a buffer layer surrounding the fiber wherein a thickest component of the buffer layer has an elastic modulus greater than 515 MPa (75,000 psi), and a jacket surrounding the buffer layer, wherein the jacket has a thickness of at least 1.2 mm. In one preferred embodiment, the buffer layer includes a nylon 12 resin with a nominal elastic modulus of approximately 218,000 psi. In this embodiment, an inner thin component of the buffer layer is made of an ethylene/ethyl acrylate resin so as to facilitate stripping of the buffer layer away from the fiber.

17 Claims, 1 Drawing Sheet

BEND INSENSITIVE FIBER OPTIC DROP CABLE FOR IN-HOME USE

CROSS REFERENCE TO RELATED APPLICATION

The present application claims priority under 35 U.S.C. §119(e) of U.S. Provisional Patent Application No. 61/056, 468 filed May 28, 2008, entitled "In-Home Wiring Flame Retardant Drop Cable With Stiff Tight Buffer" and which is incorporated by reference.

BACKGROUND OF THE INVENTION

1. Field of the Invention

This invention relates to fiber optic cable constructions, particularly a fiber optic cable suitable for use indoors at customer premises.

2. Discussion of the Known Art

Fiber-to-the-home (FTTH) services are usually supplied by so-called "drop" cables that route an optical fiber between a service provider's cable, and an optical network terminal (ONT) associated with a customer's residence. For typical North American installations, the enclosure of the ONT is mounted outside the residence and it protects the ONT from the outdoor environment. There is, however, a desire to deploy FTTH services in the following two new ways:

1. Service inside multi-dwelling units (MDUs), including high-rise buildings, low-rise buildings, and clustered developments of garden apartments. Here, the drop cables must run inside the building to an ONT mounted indoors at each residence.

2. Deployment of the ONT inside a home in single family dwellings. The current outdoor ONTs are large, bulky and aesthetically displeasing. Redesigning the ONT physically for placement inside the home would also allow it to be powered directly from the home's AC wiring, and a battery backup would be easier to deploy.

Both of the above scenarios require the fiber optic drop cable to be flame-retardant in order to comply with the applicable safety codes, and to limit the spread of fire in emergency situations. The drop cable should also be able to be installed inconspicuously inside the residence, and have robust optical and mechanical performance to allow for installation by workers having relatively low skill. Ideally, the cable should be capable of (a) being routed and installed in a manner similar to traditional copper wire cable used for decades to deliver telephony service, (b) wrapping tightly around sharp corners on walls, doors and wooden framing, (c) routing through basements and behind walls, and (d) being secured in place by way of conventional metal cable staples.

Optical drop cables under development for indoor use employ so-called bend insensitive singlemode fibers contained in thick, flame retardant jackets. For example, "ClearCurve™" optical fibers and drop cables are currently offered by Corning Inc., and have a 900 micron O.D. tight buffer surrounding the optical fiber for dimensional compatibility with existing factory mounted or splice-on optical connectors. The buffer material is believed to be a low cost flexible or semi-rigid poly(vinyl chloride) resin, thus providing an economical solution since the resin has a relatively low cost. The bend insensitive fiber allows the cable to be installed over a path having sharp bends with minimal signal attenuation, while a thick jacket prevents the fiber itself from being bent too sharply so as to preserve the fiber's specified optical performance. It has been discovered, however, that the known PVC buffers do not allow optimal protection against signal attenuation to be achieved in all FTTH applications.

Co-pending U.S. patent application Ser. No. 12/072,869 filed Feb. 28, 2008, and assigned to the assignee of the present application and invention, discloses a bend insensitive singlemode fiber having relatively low bend loss when bent to a radius of about 4 to 15 mm, and an effective aperture (Aeff) matched to that of standard singlemode fiber so as to enable the bend insensitive fiber to couple efficiently with a standard fiber when the two fibers are spliced to one another. The '869 application was published as US 2009/0060437 on Mar. 5, 2009.

Specifically, the fiber of the mentioned '869 application has a core and a cladding region for propagating light in a fundamental transverse mode. The cladding region includes (i) an outer cladding having a refractive index less than that of the core region, (ii) an annular pedestal region having a refractive index higher than that of the outer cladding and comparable to that of the core, (iii) an annular inner trench region disposed between the core and the pedestal region, the inner trench region having a refractive index less than that of the outer cladding, and (iv) an annular outer trench region disposed between the pedestal region and the outer cladding, the outer trench region having a refractive index less than that of the outer cladding. In addition, to suppress higher order transverse modes (HOMs), the pedestal region may be configured to couple at least one other transverse mode of the core resonantly to at least one transverse mode of the pedestal region.

For bend loss to be less than that of standard singlemode fiber at important operating wavelengths (e.g., 1300 nm, 1550 nm, and 1650 nm) for any bend radius in the range of about 4 to 15 mm, at least one of the inner and the outer trench regions (and preferably both) of the fiber of the '869 application provides a total contrast much higher than that of a standard singlemode fiber. In one embodiment disclosed in the '869 application, the contrast is given by:

$$|n_{inner\ trench} - n_{core}| > 0.007, \text{ and/or} \quad (\text{Eq. 1})$$

$$|n_{outer\ trench} - n_{core}| > 0.007. \quad (\text{Eq. 2})$$

For example, at least the inner trench-to-core contrast of Eq. 1, above, is approximately 0.008 to 0.020.

In addition, the interface between the outer cladding and the outer trench region should be located at a radial distance of approximately 17 to 23 μm from the center of the core, to enable the fiber to assume a bend radius of about 4 to 15 mm without significant loss. The refractive indicies of the core and the pedestal region should also be comparable; that is, $$|n_{core} - n_{ped}| < 0.003$$

Example III of the '869 application defines an embodiment of a fiber having a dual trench, ring design as illustrated in FIG. 1B of the application, wherein the inner and the outer trench regions are both relatively deep and have essentially the same index depth. Specifically, the fiber has the following parameters and optical properties as taken from Tables 4 and 5 of the '869 application. The Δn values are relative to $n_{outer\ cladding}$.

| $r_{core}$ | $\Delta n_{core}$ | $t_{shelf}$ | $\Delta n_{shlf}$ | $t_{tri}$ | $\Delta n_{tri}$ | $t_{ped}$ | $\Delta n_{ped}$ | $t_{tro}$ | $\Delta n_{tro}$ | $r_{ped}$ |
|---|---|---|---|---|---|---|---|---|---|---|
| 4.4 | 0.0039 | 2.2 | −0.0004 | 4.7 | −0.0057 | 2.6 | 0.0039 | 7.2 | −0.0057 | 12.6 |

| MFD at 1310 nm | Bend Loss at 1550 nm (4.8 mm cable bend radius) | Standard Cable Cutoff (22 m fiber length) | Jumper Cable Cutoff (2 m fiber length) |
| --- | --- | --- | --- |
| 8.9 μm | 0.025 dB/turn | 1222 nm | 1253 nm |

All relevant portions of the mentioned US 2009/0060437 patent application publication are incorporated by reference.

U.S. Pat. No. 5,684,910 (Nov. 4, 1997) discloses a buffered optical fiber having a strippable buffer layer. At least one layer of a protective coating is provided on the cladding of the fiber, and a plastics buffer layer of, e.g., nylon or poly(vinyl-chloride) (PVC) with a thickness in the range of 0.008 to 0.014 inch jackets the coated fiber. A boundary layer comprised of, e.g., an acrylate copolymer material is disposed between the fiber coating and the buffer layer, and has a thickness greater than about one-twenty-fifth the thickness of the buffer layer. If stiffer type materials such as low-smoke poly(vinyl-chloride)(LSPVC) or fire-retardant polypropylene (FRPP) are used for the buffer layer, then the boundary layer may be as thin as about 0.0005 inch, according to the patent.

Sufficient adhesion exists between the plastics buffer layer and the coated optical fiber to maintain the buffer layer in place during normal use of the fiber. The adhesion is low enough, however, so that the buffer layer can be removed without inflicting damage to the fiber when a reasonable mechanical stripping force is applied. All relevant portions of the mentioned '910 US patent are incorporated by reference.

SUMMARY OF THE INVENTION

According to the invention, a bend insensitive fiber optic cable includes a singlemode fiber, a buffer layer surrounding the fiber wherein a thickest component of the buffer layer has an elastic modulus greater than 515 MPa (75,000 psi), and a jacket surrounding the buffer layer, wherein the jacket has a thickness of at least 1.2 mm. In one preferred embodiment, the buffer layer includes a nylon 12 resin with a nominal elastic modulus of approximately 218,000 psi. In this embodiment, an inner thin component of the buffer layer is made of an ethylene/ethyl acrylate resin so as to facilitate stripping of the buffer layer away from the fiber.

For a better understanding of the invention, reference is made to the following description taken in conjunction with the accompanying drawing and the appended claims.

DETAILED DESCRIPTION OF THE INVENTION

Figure 1:
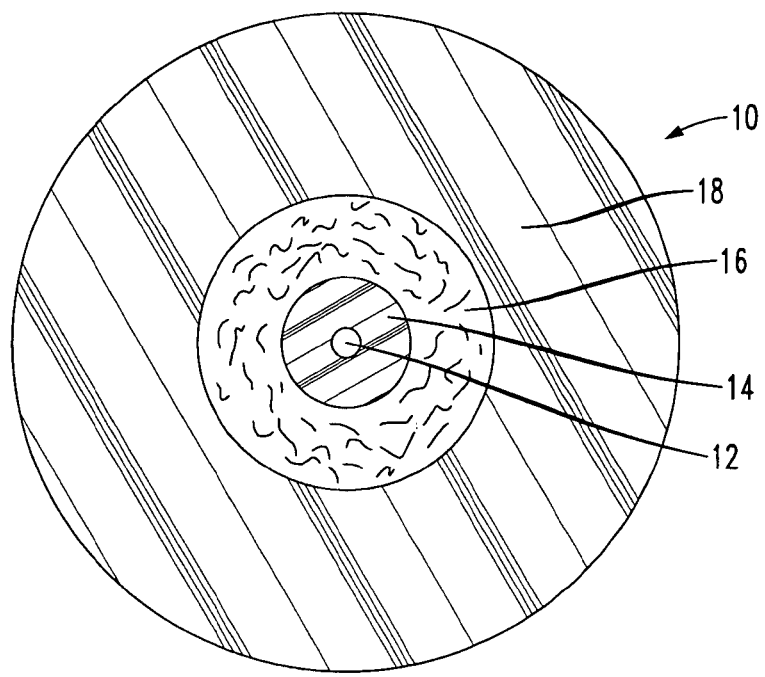
FIG. 1 is a cross section of a length of the inventive fiber optic drop cable in a plane perpendicular to the axis of the cable.

FIG. 1 is a cross sectional view showing the construction of a fiber optic drop cable 10 according to the invention. The cable 10 includes:

Optical fiber 12. The optical fiber 12 preferably has parameters and optical properties substantially similar or identical to those of the singlemode fiber of Example III in the mentioned U.S. patent application Ser. No. 12/072,869, with typical dimensions. That is, the outer cladding of the fiber 12 has a 125-micron diameter, and the cladding is coated with a dual-layer coating including a relatively soft primary coating and a relatively hard secondary coating so that the total diameter of the fiber 12 is approximately 250 microns. The inner primary and the outer secondary coatings are preferably UV-cured acrylates.

Tight buffer layer 14. The optical fiber 12 is tight buffered to provide further mechanical protection for the fiber, as well as to support compatibility with standard connector piece parts. The buffer layer 14 preferably has an overall diameter of 900+/−50 microns, and is made of a polymeric resin with a flexural modulus of at least 75,000 psi, preferably 150,000 psi or higher. Acceptable materials include but are not limited to nylons, poly(butylene terephtalate), other polyesters, and stiff UV-cured acrylate materials. The buffer layer 14 may be fabricated by extrusion of UV curing of a suitable resin, and may also incorporate a relatively thin inner layer material applied at the interface of the 250 micron fiber 12 and the layer material so as to facilitate mechanical stripping of the layer for fusion splicing using standard tools, e.g., so-called Miller strippers.

In a preferred embodiment, the buffer layer 14 is made of a nylon 12 resin, e.g., Degussa Vestodur L1670, with a nominal elastic modulus of approximately 218,000 psi. In this embodiment, a thin inner layer of an ethylene/ethyl acrylate resin, e.g., Dow Amplify EA 103, is applied by co-extrusion to facilitate stripping. As described below, the use of the tight buffer layer 14 instead of a flexible or semi-flexible PVC resin, achieves lower signal attenuation through tight bends of the cable 10.

Strength members or yarns 16. In a preferred embodiment, the yarns 16 are a polyaramid fiber. Other strength yarns that may be used include fiberglass, Zylon™ PBO, and Vectron™ liquid crystal polymer.

A thick outer jacket 18. The jacket 18 preferably has a thickness of at least 1.2 mm, and the importance of the jacket thickness is discussed below in connection with reliability. Materials for jacket 18 may include PVC, flame-retardant polyolefins, polyurethanes, or other suitable materials. The jacket material should be selected so that the cable 10 will conform with the local fire codes. For example, a riser-grade PVC resin may be used in North America, and a low-smoke zero-halogen resin may be used in European applications. Geon W780L, a lead-free riser-grade PVC commercially available from the PolyOne Corporation, may be used as the outer jacket in a preferred embodiment.

Use of the thick jacket 18, thicker than the jacket used in standard 2.0 mm, 2.4 mm, and 3.0 mm cordage, will ensure long-term mechanical reliability of the optical fiber 12. If the fiber is bent to a very tight bend radius, it may break due to high tensile stress caused by the geometry of the bend and other stresses imposed on the cable during installation.

Figure 2:
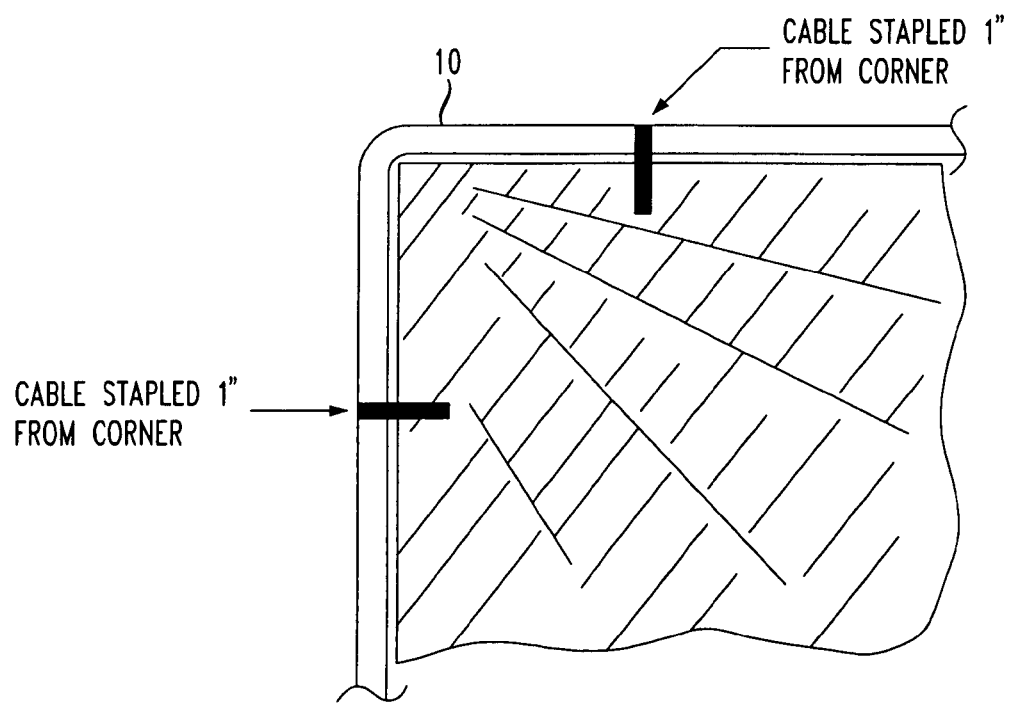
FIG. 2 illustrates a length of the inventive cable routed over and stapled to a wooden frame so as to conform with a 90 degree corner on the frame.

When a length of the cable 10 is routed to conform with a 90-degree corner of a 2"×4" wooden board, and secured with cable staples each approximately 1" from the corner as shown in FIG. 2, the minimum bend radius of the fiber is limited to approximately the diameter of the cable 10. This has been determined by X-ray measurement of the fiber bend radius when routed around corners of 2"×4" boards, as shown below in Table 1:

TABLE 1

| Cable Construction - O.D. | Measured Fiber Bend Radius |
|---|---|
| 3.0 mm (prior art) | 3.4 mm |
| 4.7 mm, PVC buffer | 5.8 mm |
| 4.7 mm, stiff nylon dual component layer buffer | 5.6 mm |

Mechanical reliability may be determined by three steps, viz.;

1. Measuring the dynamic fatigue of the bare fiber 12 at a wide variety of fiber bend radii;
2. Measuring the dynamic fatigue of the fiber 12 when the cable 10 is under tension, to determine the effect of added installation tension on reliability and quantify the way in which the cable 10 protects the central fiber 12; and
3. Using the well-established model of IEC 62048 to estimate fiber lifetime in bending, which can be calculated based on static fatigue properties of the glass, applied tension, and fiber bend radius.

Following the above steps, the probability of mechanical failure due to static fatigue has been calculated as shown in Table 2, below. The calculations assume installation tensions of 4.5 and 31 pounds for each cable diameter. Twenty year failure probability is currently considered a typical expected lifetime for in-home fiber optic drop cabling.

TABLE 2

Failure probability at fiber minimum bend radius for 3.0 mm, 3.8 mm, and 4.7 mm OD cables..

| Cable diameter | 20-year failure probability, minimum fiber bend radius, 4.5 lbs. applied tension | 20-year failure probability, minimum fiber bend radius, 31 lbs. applied tension |
|---|---|---|
| 3.0 mm (prior art) | 1.8 ppm | 1000000 ppm |
| 3.8 mm (minimum OD for cable 10, with 1.2 mm jacket 18 thickness) | 0.65 ppm | 2.9 ppm |
| 4.7 mm (preferred OD for cable 10) | 0.44 ppm | 2.5 ppm |

Accordingly, as shown in Table 2, mechanical reliability is improved dramatically by the use of the thicker-than-standard jacket 18.

Further, it has been found that the use of relatively stiff material for the buffer layer 14 leads to a quantifiable improvement in signal attenuation when the cable 10 is routed around 90-degree corners as in FIG. 2.

Specifically, two sample cables were fabricated each with an optical fiber having the parameters and optical properties of the singlemode fiber of Example III in the mentioned U.S. patent application Ser. No. 12/072,869. Both cables were made with a PolyOne W780L PVC jacket 18 having an outer diameter of 4.7 mm and four strands of 2160 denier DuPont Kevlar® 49 aramid yarn 16. One of the cables used the preferred dual component nylon/ethylene-ethyl acrylate 900 micron tight buffer layer 14, while the other cable used a buffer layer made of PolyOne W780L PVC. Both cables were terminated with SC-APC type connectors.

The two sample cables were routed conformally around 90-degree corners on pine wood 2"×4" s, and secured about the corner by stapling at two places each approximately one inch from the corner as in FIG. 2. Relative attenuation was monitored with a JDSU power meter operating at 1550 nm.

Table 3 below shows the average results of eight measurements for the cable with the tight nylon buffer layer 14, and four measurements for the cable with the PVC buffer layer.

TABLE 3

Measured bend radius and attenuation for PVC-buffer and nylon buffer 4.7 mm cables

| Construction | Measured Fiber Bend Radius | Measured Attenuation |
|---|---|---|
| 4.7 mm OD, PVC buffer | 5.8 mm | 0.19 dB, average |
| 4.7 mm OD, stiff nylon dual layer buffer 14 | 5.6 mm | 0.04 dB, average |

As shown in Table 3, the cable with the tight nylon buffer layer 14 exhibited lower attenuation. It is believed that this is due to the fact that the stiff buffer material has superior resistance to deformation from bending on a local level. Although the measured bend radius of the fiber is approximately the same for both sample cables, the difference in the measured attenuation indicates that the fiber with the stiffer buffer layer 14 is more capable of resisting such local deformation that would cause microbends and increased signal attenuation in the fiber.

The above experiment was repeated with the addition of a commercially available sample of the earlier mentioned Corning ClearCurve cable, terminated with SC-APC connectors. Table 4 below shows average measured macrobend loss for 4.8 mm OD sample cables that were bent 90 degrees around a corner of a pine wood 2"×4", and stapled at two places each ¾-inch from the corner.

TABLE 4

| Sample | Fiber Used | Average Loss, dB, at 1550 nm | Number of Trials |
|---|---|---|---|
| Cable 10 with stiff buffer layer 14 | Example III of '869 appl'n | 0.035 | 8 |
| Cable 10 with standard soft PVC buffer layer | Example III of '869 appl'n | 0.19 | 4 |
| ClearCurve cable with soft PVC buffer layer | ClearCurve | 0.045 | 4 |

The following measurements were also taken of the ClearCurve fiber and the fiber of Example III of the mentioned '869 application, both outside of cable form.

Loss per 360 degree turn, 5 mm fiber bend radius:

Example III of '869 appl'n: 0.33 dB/turn, average

Corning ClearCurve: 0.22 dB/turn, average

The above measurements suggest that although the fiber of Example III may exhibit a higher macrobending loss than Corning's ClearCurve fiber when both fibers are tested outside of cable form, the fiber of Example III has comparable or slightly better macrobending performance than ClearCurve when packaged in the inventive cable 10.

It will also be understood that desired lengths of the inventive cable 10 may be provided in the form of pigtails or jumpers terminated with standard fiber optical connectors (e.g., types SC, LC, ST or FC), or with next generation so-called hardened connectors.

As disclosed herein, the inventive fiber optic drop cable 10 is well suited for low cost, in-home wiring and uses a rigid buffer layer 14 that is, e.g., 900 microns thick. The thick jacket 18 of the cable serves to limit bending of the cable when routed around sharp corners, thus allowing the cable to have sufficient mechanical reliability for long-term use over 20 years. Unlike prior cables that use relatively soft PVC buffer materials, the stiff buffer layer 14 reduces optical signal attenuation that would otherwise result from routing the cable about tight corners or bends, as well as from the use of cable staples during installation.

While the foregoing represents a preferred embodiment of the invention, it will be understood by those skilled in the art that various modifications and changes may be made without departing from the spirit and scope of the invention, and that the invention includes all such modifications and changes as are within the bounds of the following claims.

We claim:

1. A bend insensitive fiber optic cable, comprising:
   a singlemode fiber;
   a tight buffer layer surrounding the fiber, wherein a thickest component of the buffer layer has an elastic modulus greater than 515 MPa (75,000 psi); and
   an outer jacket surrounding the buffer layer, wherein the jacket has a thickness of at least 1.2 mm and an outside diameter of approximately 4.7 mm;
   wherein the fiber comprises a core and a cladding region for propagating light in a fundamental transverse mode, and the cladding region includes
   (i) an outer cladding having a refractive index less than the refractive index of the core ($n_{core}$),
   (ii) an annular pedestal region having a refractive index ($n_{ped}$) higher than that of the outer cladding and comparable to that of the core,
   (iii) an annular inner trench region disposed between the core and the pedestal region, the inner trench region having a refractive index ($n_{inner\ trench}$) less than that of the outer cladding, and
   (iv) an annular outer trench region disposed between the pedestal region and the outer cladding, the outer trench region having a refractive index ($n_{outer\ trench}$) less than that of the outer cladding; and
   wherein at least one of $|n_{inner\ trench} - n_{core}|$ and $|n_{outer\ trench} - n_{core}| > 0.007$; and
   an interface between the outer cladding and the outer trench region is located at a radial distance of 17 to 23 microns from the center of the core.

2. A fiber optic cable according to claim 1, wherein the buffer layer has an outer diameter of about 900 microns.

3. A fiber optic cable according to claim 1, wherein the buffer layer comprises a material selected from the group including nylon, poly(butylene terephtalate), polyesters, and UV-cured materials.

4. A fiber optic cable according to claim 1, wherein the buffer layer has a thin, relatively soft inner layer component at an interface with the fiber to facilitate stripping the buffer layer away from the fiber.

5. A fiber optic cable according to claim 1, wherein the thickest component of the buffer layer includes a nylon 12 resin with a nominal elastic modulus of approximately 218,000 psi.

6. A fiber optic cable according to claim 5, wherein the buffer layer has an inner thin component made of an ethylene/ethyl acrylate resin so as to facilitate stripping of the buffer layer away from the fiber.

7. A fiber optic cable according to claim 5, wherein the buffer layer has an outer diameter of about 900 microns.

8. A fiber optic cable according to claim 1, including strength members or yarns disposed between the buffer layer and the outer jacket.

9. A fiber optic cable according to claim 8, wherein the strength members comprise polyaramid fiber yarns.

10. A fiber optic cable according to claim 1, wherein the outer jacket comprises of a material selected from the group including PVC, flame-retardant polyolefins, and polyurethanes.

11. A fiber optic cable according to claim 1, wherein $|n_{core} - n_{ped}| < 0.003$.

12. A fiber optic cable according to claim 1, wherein the pedestal region is configured to couple at least one other transverse mode of the core resonantly to at least one transverse mode of the pedestal region, for suppressing higher order transverse modes (HOMs).

13. A fiber optic cable according to claim 1, wherein the fiber has one or more coatings, and a diameter of about 250 microns.

14. A length of the fiber optic cable according to claim 1, and a fiber optical connector disposed at one or both ends of the length of cable for terminating the length of cable.

15. The length of fiber optic cable according to claim 14, wherein the fiber optical connector is selected from the group comprising SC, LC, ST and FC type connectors.

16. A fiber optic cable according to claim 1, wherein $|n_{inner\ trench} - n_{core}|$ is approximately 0.008 to 0.020.

17. A fiber optic cable according to claim 1, wherein an attenuation of about 0.04 dB at a wavelength of 1550 nm is produced when the cable is routed to conform with a 90-degree corner and the fiber has a bend radius of about 5.6 mm.

* * * * *